(12) United States Patent
Kim

(10) Patent No.: US 6,445,420 B1
(45) Date of Patent: Sep. 3, 2002

(54) APPARATUS FOR DETECTING DATA IN A VERTICAL BLANKING PERIOD OF A RADIO FREQUENCY BROADCASTING SIGNAL

(75) Inventor: Hak-Sung Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/991,338

(22) Filed: Dec. 16, 1997

(30) Foreign Application Priority Data

Dec. 16, 1996 (KR) ............................. 96-66387

(51) Int. Cl.⁷ ............................................ H04N 7/08
(52) U.S. Cl. ...................................... 348/465; 348/468
(58) Field of Search ............................. 348/465, 468, 348/469, 473, 478, 476, 500, 537, 518, 525

(56) References Cited

U.S. PATENT DOCUMENTS 4,819,231 A * 4/1989 Yamada ..................... 370/94
5,852,471 A * 12/1998 Furuya et al. ............. 348/465

* cited by examiner

*Primary Examiner*—Victor R. Kostak
(74) *Attorney, Agent, or Firm*—Staas & Halsey LLP

(57) ABSTRACT

An apparatus for detecting data included in a vertical blanking interval of a radio frequency broadcasting signal which can reduce the possibility of error generation in fetching data, and thus accurately and rapidly receive and process additional information included in the broadcasting signal. The data detecting apparatus includes a clock signal generating section for generating a predetermined fetch clock signal in response to a predetermined master clock signal and reset signal, an enable signal generating section for receiving a line select signal and generating a predetermined enable signal in accordance with the master clock signal and the fetch clock signal, a data delay section for delaying serial data for a predetermined time in accordance with the master clock signal and outputting delayed serial data, and a data conversion section for receiving the delayed serial data from the data delay section and converting the delayed serial data into parallel data in accordance with the fetch clock signal from the clock signal generating section, the enable signal from the enable signal generating section, and the reset signal.

31 Claims, 3 Drawing Sheets

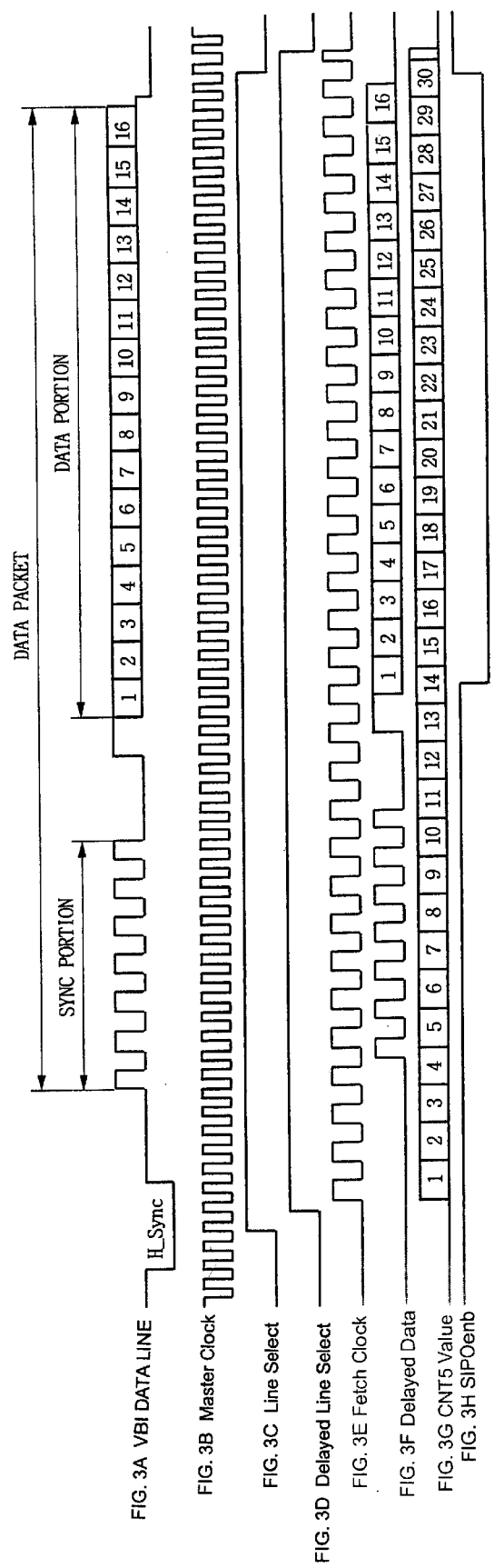

APPARATUS FOR DETECTING DATA IN A VERTICAL BLANKING PERIOD OF A RADIO FREQUENCY BROADCASTING SIGNAL

BACKGROUND OF THE INVENTION

1. Field of the Invention

The present invention relates to an apparatus for detecting data included in a vertical blanking interval of a radio frequency broadcasting signal. In particular, the present invention relates to an apparatus for detecting data included in the vertical blanking interval of the radio frequency broadcasting signal, which generates a data fetch clock signal using a frequency that is twice the data transmission rate as a master clock signal, and fetches character data in accordance with the fetch clock signal.

2. Description of the Related Art

Generally, the vertical blanking interval of the radio frequency broadcasting signal means the period where no picture signal is contained. In order to efficiently use this period, research has been continually progressing in encoding a teletext signal, a caption signal, etc., in the vertical blanking interval of the broadcasting signal.

Conventionally, there have been many techniques for implementing various functions by detecting a character signal loaded in a data packet in the vertical blanking interval. Most of them fetch the data using a clock signal synchronized with a horizontal sync signal separated from a composite video signal, or using a free-running clock signal or a clock signal synchronized with a clock run-in (CRI) signal.

According to the conventional technique for synchronizing the data fetch clock signal with the horizontal sync signal, the position of the separated horizontal sync signal may vary due to the deviation of the peripheral components, and this causes the position of the data fetch clock signal synchronized with the horizontal sync signal also to vary, thereby heightening the possibility of error generation during data reception.

Meanwhile, in case of the technique using the free-running clock signal, the possibility of error generation during data reception becomes high since there is no correlation between the data and the clock signal. In case of the technique using the clock synchronized with the CRI signal contained in the sync portion of the data packet, the possibility of error generation during data reception becomes relatively low, but its circuitry becomes complicated. Also, since the frequency of the master clock signal should be much faster than the data transmission rate of the vertical blanking interval, the generation of noise which adversely affects the peripheral circuits becomes increased.

SUMMARY OF THE INVENTION

It is an object of the present invention to solve the problems involved in the related art, and to provide an apparatus for detecting data encoded in the radio frequency broadcasting signal which can reduce the possibility of error generation during data reception, simplify its circuit construction, and suppress the noise generation in the peripheral circuits by generating a data fetch clock signal using a frequency which is twice the data transmission rate as a master clock signal and by fetching character data in accordance with the fetch clock signal.

Additional objects and advantages of the invention will be set forth in part in the description which follows and, in part, will be obvious from the description, or may be learned by practice of the invention.

In order to achieve the above and other objects, there is provided an apparatus for detecting data included in a radio frequency broadcasting signal, comprising:

a clock signal generating section for generating a predetermined fetch clock signal in response to a predetermined master clock signal and a delayed line select signal;

an enable signal generating section for receiving and delaying a line select signal, and generating the delayed line select signal in accordance with the master clock signal and a predetermined enable signal in accordance with the master clock signal and the fetch clock signal;

a data delay section for delaying serial data for a predetermined time in accordance with the master clock signal and outputting delayed serial data; and a data conversion section for receiving the delayed serial data from the data delay section and converting the delayed serial data into parallel data in accordance with the fetch clock signal from the clock signal generating section, the enable signal from the enable signal generating section, and a reset signal.

In the present invention, a master clock which is accurately twice the data transmission rate of digital data included in the vertical blanking period, is used, and a composite sync signal is used instead of the horizontal sync signal of a phase lock loop (PLL).

BRIEF DESCRIPTION OF THE DRAWINGS

The above object, other features and advantages of the present invention will become more apparent by describing the preferred embodiment thereof with reference to the accompanying drawings, in which:

FIG. 3 is a waveform diagram explaining the operational timing of the circuit of FIG. 2.

DETAILED DESCRIPTION OF THE PREFERRED EMBODIMENT

Figure 1:
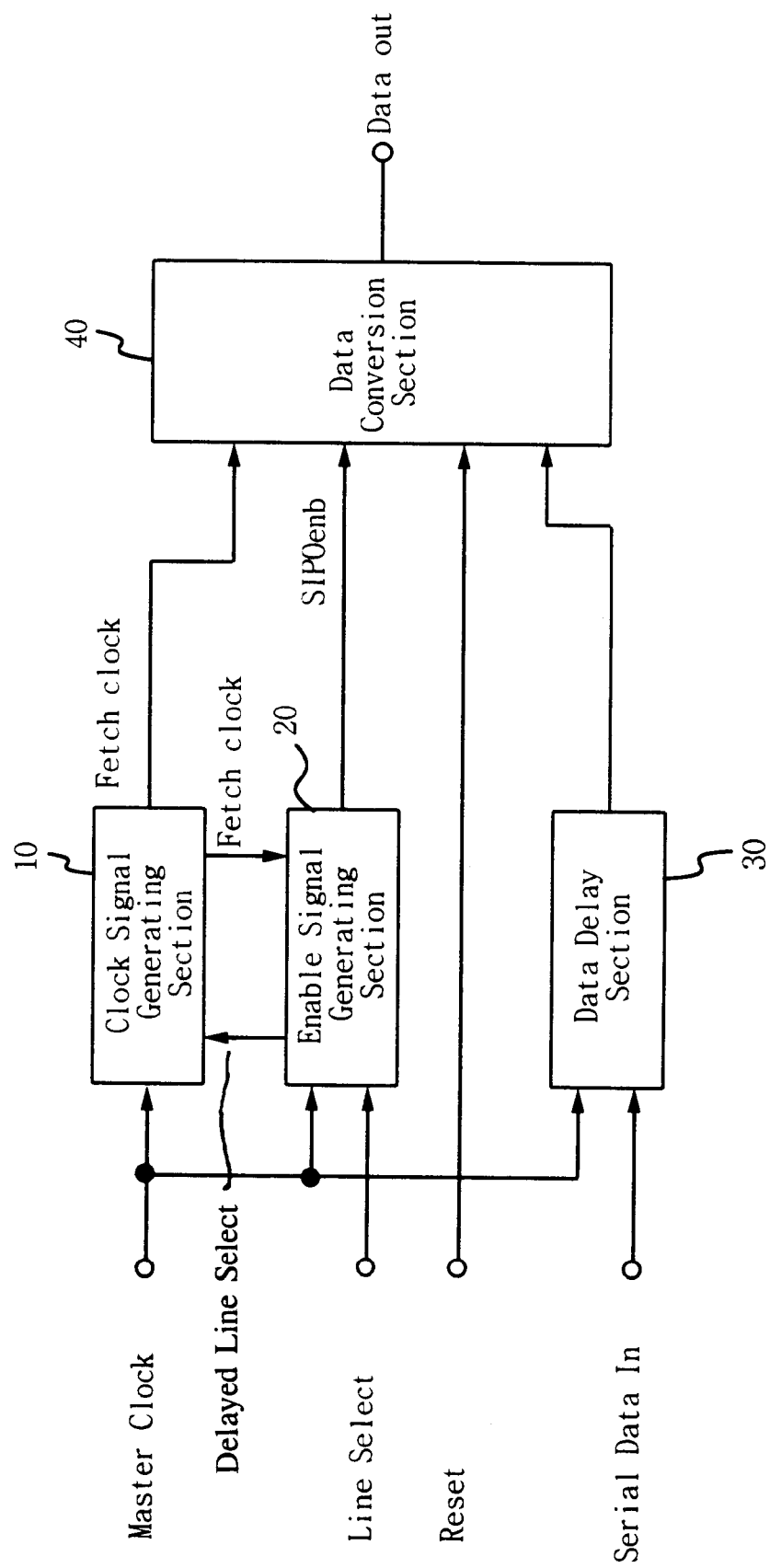
FIG. 1 is a block diagram of an apparatus for detecting data encoded in a vertical blanking interval according to an embodiment of the present invention.

FIG. 1 is a block diagram of the apparatus for detecting data encoded in the vertical blanking period of a radio frequency broadcasting signal according to the embodiment of the present invention.

Referring to FIG. 1, a clock signal generating section 10 generates a predetermined fetch clock signal in response to a predetermined master clock signal and a delayed line select signal.

An enable signal generating section 20 receives and delays a line select signal, and generates the delayed line select in accordance with the master clock signal and a predetermined enable signal SIPOenb in accordance with the master clock signal and the fetch clock signal.

A data delay section 30 delays serial data for a predetermined time in accordance with the master clock signal and outputs the delayed serial data.

A data conversion section 40 receives the delayed serial data from the data delay section 30 and converts the delayed serial data into parallel data in accordance with the fetch clock signal from the clock generating section 10, the enable signal SIPOenb from the enable signal generating section 20, and a predetermined reset signal.

Figure 2:
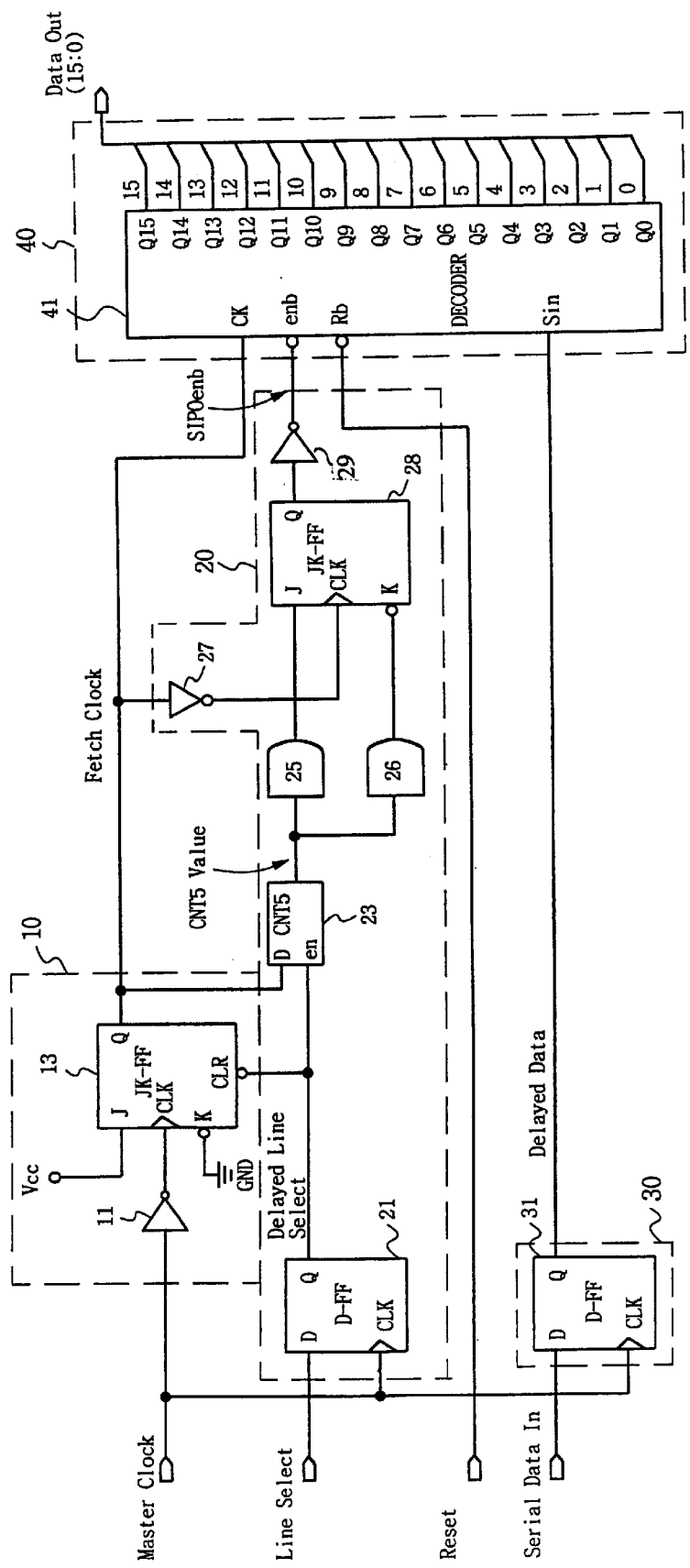
FIG. 2 is a schematic circuit diagram of the apparatus of FIG. 1.

FIG. 2 is a schematic circuit diagram of the apparatus for detecting data encoded in the vertical blanking period of the radio frequency broadcasting signal according to the preferred embodiment of the present invention.

Referring to FIG. 2, the data detecting apparatus includes the clock signal generating section 10, the enable signal generating section 20, the data delay section 30, and the data conversion section 40.

The clock signal generating section 10 includes a first inverter 11 for inverting the master clock signal, the frequency of which is twice the predetermined data transmission rate, and a first JK-type flip-flop 13 which receives a supply voltage and a ground voltage through its J terminal and K terminal, respectively, and generates the predetermined fetch clock signal in accordance with the inverted master clock signal from the first inverter 11 and the delayed line select signal.

The enable signal generating section 20 comprises a first D-type flip-flop 21 which receives the predetermined line select signal and delays the received line select signal for a predetermined time, being synchronized with the master clock signal, to generate the delayed line select signal, a counter 23 which is enabled by an output signal of the first D-type flip-flop 21 and counts an output signal of the first JK-type flip-flop 13 in the clock signal generating section 10, first and second buffers 25 and 26 for receiving and buffering an output signal of the counter 23, a second inverter 27 for receiving and inverting the predetermined data fetch clock signal, a second JK-type flip-flop 28 which receives output signals of the first and second buffers 25 and 26 through its J terminal and K terminal, respectively, and outputs the predetermined enable signal, being synchronized with the inverted data fetch clock signal from the second inverter 27, and a third inverter 29 for receiving and inverting the enable signal outputted from the second JK-type flip-flop 28.

The data delay section 30 comprises a second D-type flip-flop 31 which receives the serial data and delays the received serial data for a predetermined time, being synchronized with the master clock signal.

The data conversion section 40 comprises a decoder 41 which receives the delayed serial data from the data delay section 30 and converts the delayed serial data into the parallel data in accordance with the fetch clock signal from the clock signal generating section 10, the enable signal from the enable signal generating section 20, and the predetermined reset signal.

FIGS. 3A–3H are waveform diagrams illustrating the operational timing of the apparatus of FIG. 2. Referring to FIG. 3A, the data line included in the vertical blanking period includes a sync portion where the CRI signal is loaded, and a data portion where the data is loaded. The master clock signal for operating the apparatus has a frequency which is accurately twice the data transmission rate as shown in FIG. 3B, and this causes the noise which adversely affects the peripheral circuits to be reduced.

The operation of the data detecting apparatus according to the embodiment of the present invention as described above will be explained in detail with reference to the accompanying drawings.

If the master clock signal, the frequency of which is twice the data transmission rate, is input to the clock signal generating section 10, this master clock signal is inverted by the first inverter 11, and the inverted master clock signal is input to the terminal CLK of the first JK-type flip-flop 13. The first JK-type flip-flop 13 receives the supply voltage and the ground voltage at its J terminal input and K terminal input, respectively, in accordance with the inverted master clock signal and the delayed line select signal, and divides by two the inverted master clock signal to generate the data fetch clock signal having a half frequency of the master clock signal as shown in FIG. 3E. This data fetch clock signal is input to the counter 23 and the second inverter 27 in the enable signal generating section 20 and to the decoder 41 in the data conversion section 40 through the terminal Q of the first JK-type flip-flop 13 and via the third inverter 29.

Meanwhile, the first D-type flip-flop 21 in the enable signal generating section 20 receives the predetermined line select signal as shown in FIG. 3C, being synchronized with the master clock signal on the basis of the horizontal sync signal H-sync corresponding to the vertical blanking interval, and outputs through its terminal Q a signal obtained by delaying the master clock signal for one cycle, which is used as the delayed line select signal as shown in FIG. 3D.

The counter 23 receives the delayed line select signal through its terminal en, and is enabled by the delayed line select signal to count the fetch clock signal input from the first JK-type flip-flop 13 in the clock signal generating section 10. The counted fetch clock signal output, as shown in FIG. 3G, from the counter 23 is buffered by the first and second buffers 25 and 26 for a predetermined time, and then input to the J terminal and K terminal of the second JK-type flip-flop 28, respectively.

Specifically, the fetch clock signal input from the first JK-type flip-flop 13 to the second inverter 27 is inverted through the second inverter 27, and then input to the terminal CLK of the second JK-type flip-flop 28, so that the data fetch clock signal buffered in the first and second buffers 25 and 26 is input to the J terminal and K terminal of the second JK-type flip-flop 28, respectively, being synchronized with the inverted data fetch clock signal. The enable signal output from the terminal Q of the second JK-type flip-flop 28 is input to and inverted by the third inverter 29, and the inverted enable signal SIPOenb as shown in FIG. 3H is input to the terminal enb of the decoder 41.

Meanwhile, the second D-type flip-flop 31 in the data delay section 30 receives the serial data through its terminal D and delays the serial data for a predetermined time, being synchronized with the master clock signal.

At this state, the data conversion section 40 receives through its terminal Sin the serial data delayed for a predetermined time, as shown in FIG. 3F, by the data delay section 30, and converts the delayed serial data into parallel data in accordance with the fetch clock signal from the clock signal generating section 10, the enable signal which is output from the second JK-type flip-flop 28 and then inverted by the third inverter 29, and the predetermined reset signal. Accordingly, the decoder 41 in the data conversion section 40 converts the serial data into the parallel data to output the parallel data.

Meanwhile, the present apparatus of FIG. 1 is constructed based on a format where the data transmission rate for a caption, KBPS, EDS (extended data services), etc., is 503 Kbps, the CRI signal is 6.5 cycles, and a 3-bit start signal and 16-bit effective data are included. Also, since the data transmission rate is 503 Kbps, a master clock of 1006 Kbps is used. If the transmitted data format is different, the decoded value of the counter is adjusted, and the master clock is changed so that it has a frequency which is twice the data transmission rate.

The data loaded in the vertical blanking period is formatted in such a manner that the CRI signal starts from 10.5

μs±250 ns based on the sync signal, the serial data is synchronized with the master clock signal by clocking the serial data at the rising edge of the 1006 Kbps clock signal supplied to the apparatus, and then the serial data is fetched by a clock signal divided at the falling edge of the master clock signal. Since the data, which has been clocked at the rising edge of the master clock signal, is fetched by the clock signal divided at the falling edge of the master clock signal, the serial data, which has been clocked at the 25% or 75% position of each bit of the serial data, is fetched. Also, since the period of the master clock signal is 1 μs, and the error tolerance of the serial data is 500 ns, the margin of the present apparatus becomes twice the error tolerance of the serial data, and the error tolerance of the master clock oscillation will be at least 500 ns, which is within a horizontal scanning period of 65.3 μs, even though the error tolerance of the serial data (i.e., 500 ns) is subtracted from 1 μs, and thereby more than 1,400,000 PPM (1.4%) is permitted at a maximum.

As described above, according to the present invention, a master clock with a frequency which is accurately twice the transmission rate of the digital data included in the vertical blanking period is used, and the digital data is fetched using the composite sync signal instead of the horizontal sync signal of the PLL.

From the foregoing, it will be apparent that the present invention provides the advantages that the possibility of error generation can be lowered since the error tolerance of the serial data is widened in fetching the data included in the vertical blanking period of the picture signal, and thus additional information included in the picture signal can be accurately and rapidly received and processed.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus for detecting data included in a vertical blanking interval of radio frequency broadcasting signal, comprising:

a clock signal generating section for generating a predetermined fetch clock signal in response to a predetermined master clock signal and a delayed line select signal;

an enable signal generating section for receiving a line select signal, delaying the line select signal to generate said delayed line select signal, and converting the delayed line select signal to a predetermined enable signal in accordance with said master clock signal and said fetch clock signal;

a data delay section for delaying serial data for a predetermined time in accordance with said master clock signal, to output delayed serial data; and a data conversion section for receiving said delayed serial data from said data delay section and converting said delayed serial data into parallel data in accordance with said fetch clock signal from said clock signal generating section, said enable signal from said enable signal generating section, and a reset signal.

2. An apparatus for detecting data as claimed in claim 1, wherein said clock signal generating section comprises:

a first inverter for inverting said master clock signal; and a first JK-type flip-flop which receives a supply voltage and a ground voltage through its J terminal and K terminal, respectively, and generates said fetch clock signal, being synchronized with said inverted master clock signal from said first inverter.

3. An apparatus for detecting data as claimed in claim 1, wherein said enable signal generating section comprises:

a first D-type flip-flop which receives said line select signal and delays said received line select signal for a predetermined time, being synchronized with said master clock signal;

a counter which is enabled by an output signal of said first D-type flip-flop, and counts an output signal of a first JK-type flip-flop in said clock signal generating section;

first and second buffers for receiving and buffering an output signal of said counter;

a first inverter for receiving and inverting said fetch clock signal;

a first JK-type flip-flop which receives output signals of said first and second buffers through its J terminal and K terminal, respectively, and outputs said enable signal, being synchronized with said inverted fetch clock signal from said first inverter; and a second inverter for receiving and inverting said enable signal output from said first JK-type flip-flop.

4. An apparatus for detecting data as claimed in claim 1, wherein said data delay section comprises a D-type flip-flop.

5. An apparatus for detecting data as claimed in claim 1, wherein said data conversion section comprises a decoder.

6. An apparatus for detecting data as claimed in claim 1, wherein a frequency of said master clock signal is twice a transmission rate of said data included in said vertical blanking interval of said radio frequency broadcasting signal.

7. An apparatus for detecting data as claimed in claim 1, wherein a frequency of said fetch clock signal generated from said clock signal generating section is identical with a transmission rate of said data included in said vertical blanking interval.

8. An apparatus for detecting data as claimed in claim 2, wherein said enable signal generating section comprises:

a first D-type flip-flop which receives said line select signal and delays said received line select signal for a predetermined time, being synchronized with said master clock signal;

a counter which is enabled by an output signal of said first D-type flip-flop, and counts an output signal of said first JK-type flip-flop in said clock signal generating section;

first and second buffers for receiving and buffering an output signal of said counter;

a second inverter for receiving and inverting said fetch clock signal;

a second JK-type flip-flop which receives output signals of said first and second buffers through its J terminal and K terminal, respectively, and outputs said enable signal, being synchronized with said inverted fetch clock signal from said second inverter; and a third inverter for receiving and inverting said enable signal output from said second JK-type flip-flop.

9. An apparatus for detecting data as claimed in claim 3, wherein said data delay section comprises a second D-type flip-flop.

10. An apparatus for detecting data included in a vertical blanking interval of a broadcasting signal, said apparatus comprising:

a clock signal generator to generate a fetch clock signal based upon a delayed line select signal and data transmission rate of the data; and a processor to fetch the data in accordance with the fetch clock signal.

11. An apparatus as claimed in claim 10, wherein said clock signal generator generates the fetch clock signal based upon a master clock signal which is based upon the data transmission rate.

12. An apparatus for detecting data included in a vertical blanking interval of a broadcasting signal, said apparatus comprising:

a clock signal generator to generate a fetch clock signal based upon a data transmission rate of the data; and a processor to fetch the data in accordance with the fetch clock signal, wherein said clock signal generator generates the fetch clock signal based upon a master clock signal which is based upon the data transmission rate, and the master clock signal has a frequency twice that of the data transmission rate.

13. An apparatus as claimed in claim 10, wherein said clock signal generator generates the fetch clock signal to have a frequency identical to the transmission rate.

14. An apparatus as claimed in claim 11, wherein said clock signal generator generates the fetch clock signal to have a frequency identical to the transmission rate.

15. An apparatus as claimed in claim 12, wherein said clock signal generator generates the fetch clock signal to have a frequency identical to the transmission rate.

16. An apparatus for detecting data included in a vertical blanking enterval of a broadcasting signal, said apparatus comprising:

a clock signal generator to generate a fetch clock signal based upon a data transmission rate of the data; and a processor to fetch the data in accordance with the fetch clock signal, wherein said clock signal generator generates the fetch clock signal based upon a master clock signal which is based upon the data transmission rate, and wherein said processor includes:

an enable signal generator to convert a line select signal into an enable signal in accordance with the master clock signal and the fetch clock signal;

a data delay unit to delay the data, which is serial data, for a predetermined time in accordance with said master clock signal, to generate delayed serial data; and a data converter to convert the delayed serial data into parallel data in accordance with the fetch clock signal, the enable signal, and a reset signal.

17. An apparatus as claimed in claim 16, wherein the line select signal is synchronized with the master clock signal based upon a horizontal sync signal corresponding to the vertical blanking interval.

18. An apparatus as claimed in claim 12, wherein said processor comprises:

an enable signal generator to convert a line select signal into an enable signal in accordance with the master clock signal and the fetch clock signal;

a data delay unit to delay the data, which is serial data, for a predetermined time in accordance with said master clock signal, to generate delayed serial data; and a data converter to convert the delayed serial data into parallel data in accordance with the fetch clock signal, the enable signal, and a reset signal.

19. An apparatus as claimed in claim 18, wherein the line select signal is synchronized with the master clock signal based upon a horizontal sync signal corresponding to the vertical blanking interval.

20. An apparatus as claimed in claim 18, wherein said clock signal generator has a divider to divide a frequency of the master clock signal in two, to generate the fetch clock signal.

21. An apparatus for detecting data included in a vertical blanking interval of a broadcasting signal, said apparatus comprising:

a clock signal generator to generate a fetch clock signal based upon a data transmission rate of the data; and a processor to fetch the data in accordance with the fetch clock signal, wherein said clock signal generator generates the fetch clock signal based upon a master clock signal which is based upon the data transmission rate, and wherein said clock signal generator includes a first flip-flop to receive first and second predetermined potentials at respective J and K terminals thereof, to generate the fetch clock signal synchronized with the master clock signal.

22. An apparatus as claimed in claim 16, wherein said clock signal generator comprises a first flip-flop to receive first and second predetermined potentials at respective J and K terminals thereof, to generate the fetch clock signal synchronized with the master clock signal.

23. An apparatus as claimed in claim 16, wherein said enable signal generator comprises:

a first flip-flop to delay the line select signal for the predetermined time in accordance with the master clock signal, to generate a delayed line select signal;

a counter to count the fetch clock signal by being enabled by the delayed line select signal, to generate a count signal;

first and second buffers to buffer the count signal for predetermined times; and a second flip-flop having J and K terminals to respectively receive the outputs of said first and second buffers, to generate the enable signal which is synchronized with the fetch clock signal.

24. An apparatus as claimed in claim 18, wherein said enable signal generator comprises:

a first flip-flop to delay the line select signal for the predetermined time in accordance with the master clock signal, to generate a delayed line select signal;

a counter to count the fetch clock signal by being enabled by the delayed line select signal, to generate a count signal;

first and second buffers to buffer the count signal for predetermined times; and a second flip-flop having J and K terminals to respectively receive the outputs of said first and second buffers, to generate the enable signal which is synchronized with the fetch clock signal.

25. An apparatus as claimed in claim 22, wherein said enable signal generator comprises:

a second flip-flop to delay the line select signal for the predetermined time in accordance with the master clock signal, to generate a delayed line select signal;

a counter to count the fetch clock signal by being enabled by the delayed line select signal, to generate a count signal;

first and second buffers to buffer the count signal for predetermined times; and a third flip-flop having J and K terminals to respectively receive the outputs of said first and second buffers, to generate the enable signal which is synchronized with the fetch clock signal.

26. An apparatus as claimed in claim 16, wherein said data delay unit comprises a flip-flop to delay the serial data in accordance with the fetch clock signal.

27. An apparatus as claimed in claim 25, wherein said data delay unit comprises a flip-flop to delay the serial data in accordance with the fetch clock signal.

28. An apparatus as claimed in claim 12, wherein the data is caption data having the transmission rate of approximately 503 Kbps, the master clock signal has the frequency of approximately 1006 Kbps.

29. An apparatus as claimed in claim 12, wherein the data is synchronized with the master clock signal by being clocked at a rising edge of the master clock signal, and is fetched by the fetch clock signal divided at a falling edge of the master clock signal.

30. An apparatus for detecting digital data included in a vertical blanking interval of a broadcasting signal, said apparatus comprising:
   a clock signal generator to generate a fetch clock signal based upon a delayed line select signal and composite sync signal of the digital data; and
   a processor to fetch the data in accordance with the fetch clock signal.

31. An apparatus for detecting data included in a vertical blanking interval of a broadcasting signal, said apparatus comprising:
   a clock signal generator to generate a fetch clock signal based upon a data transmission rate of the data; and
   a processor to fetch the data in accordance with the fetch clock signal,
   wherein said clock signal generator generates the fetch clock signal based upon a master clock signal which is based upon the data transmission rate, and wherein:
      said clock signal generator generates the fetch clock signal based upon the master clock signal and a delayed line select signal; and
      said processor includes:
         an enable signal generator to delay a line select signal to generate the delayed line select signal and convert the delayed line select signal into an enable signal in accordance with the master clock signal and the fetch clock signal,
         a data delay unit to delay the data, which is serial data, for a predetermined time in accordance with said master clock signal, to generate delayed serial data, and
         a data converter to convert the delayed serial data into parallel data in accordance with the fetch clock signal, the enable signal, and a reset signal.

* * * * *